United States Patent [19]

Kawashima et al.

[11] Patent Number: 5,898,465
[45] Date of Patent: Apr. 27, 1999

[54] AUTOMATIC CONVERGENCE ADJUSTMENT SYSTEM WITH THE CAPACITY TO MODIFY TEST PATTERNS TO BE WITHIN A PREDETERMINED RANGE

[75] Inventors: Toshiyuki Kawashima, N. Huntingdon, Pa.; Shigemasa Kamimura, Chiba, Japan

[73] Assignees: Sony Corporation, Tokyo, Japan; Sony Corporation of America, Park Ridge, N.J.

[21] Appl. No.: 09/015,544

[22] Filed: Jan. 29, 1998

[51] Int. Cl.$^6$ .............................. H04N 3/22; H04N 9/28
[52] U.S. Cl. .............................. 348/745; 348/807
[58] Field of Search ............................ 348/745, 746, 348/747, 806, 807, 189, 190, 191, 181; 315/368.11, 368.22

[56] References Cited

U.S. PATENT DOCUMENTS

| | | | |
|---|---|---|---|
| 4,857,998 | 8/1989 | Tsujihara et al. | 358/60 |
| 4,999,703 | 3/1991 | Henderson | 358/60 |

*Primary Examiner*—Andrew I. Faile
*Assistant Examiner*—Sam Huang
*Attorney, Agent, or Firm*—Frommer Lawrence & Haug, LLP.; William S. Frommer

[57] ABSTRACT

Apparatus and method for performing convergence calibration in a system that uses multiple beams to generate a video display on a screen. A photosensor is exposed to first and second distinct convergence test patterns which have illuminated areas that cover approximately first and second halves of the photosensor, respectively. For each beam, first and second output signals are generated by the photosensor when the first and second test patterns are generated, respectively, and alignment is determined on the basis of the output signals. The test patterns are selected in such a manner as to reduce the dynamic range requirement for the A/D converter(s) that digitize photosensor output signals. Optionally, measurement resolution is enhanced by varying test pattern density in accordance with the A/D converter input signal level so as to maintain a generally constant A/D converter input level. This approach optimizes A/D converter resolution, thereby enhancing measurement resolution even when CRT and photosensor characteristics vary. Test pattern density may be reduced by generating a segregated test pattern.

12 Claims, 11 Drawing Sheets

NO PATTERN

NO PATTERN

FIG. 10A
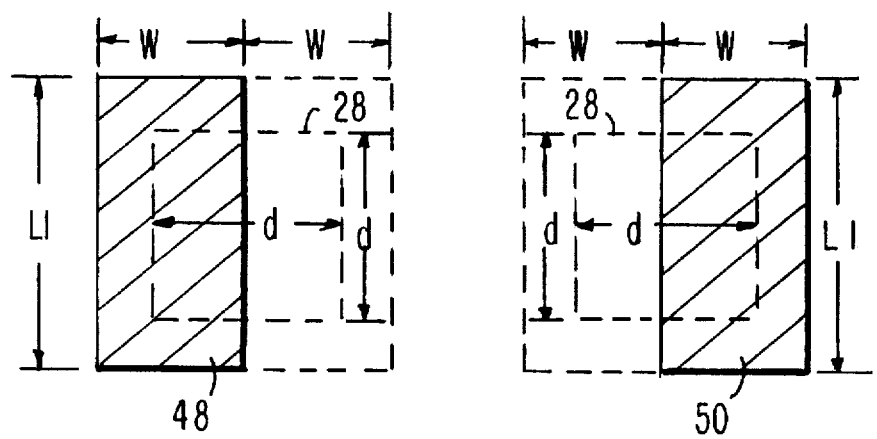
FIG. 10B
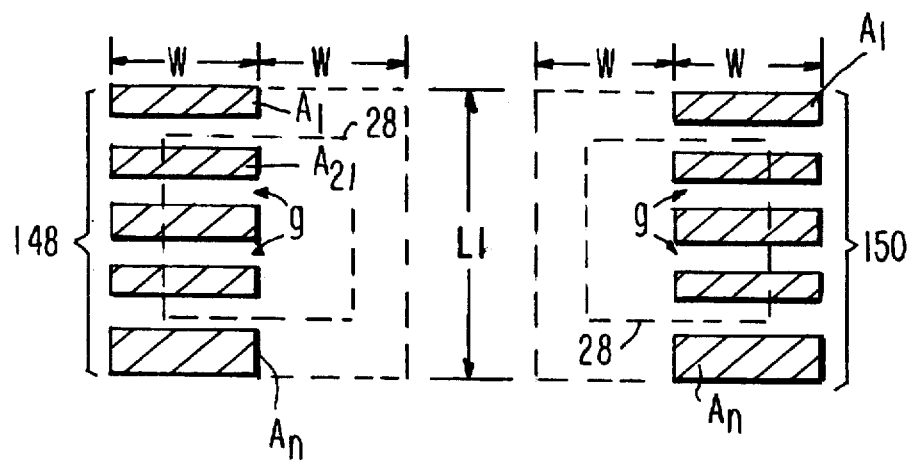
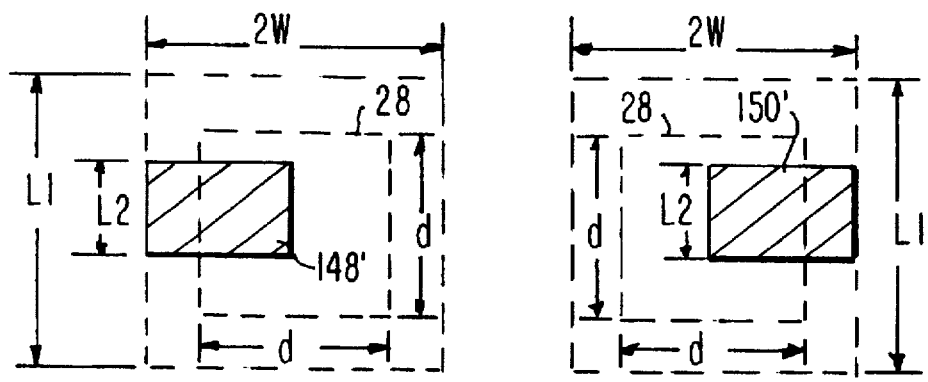
FIG. 10C

AUTOMATIC CONVERGENCE ADJUSTMENT SYSTEM WITH THE CAPACITY TO MODIFY TEST PATTERNS TO BE WITHIN A PREDETERMINED RANGE

FIELD OF THE INVENTION

This invention relates to video displays, and more particularly to performing convergence calibration in video displays.

BACKGROUND OF THE INVENTION

It is well known in the field of video displays to generate pictures on a screen by combining multiple beams of light. For example, a typical rear projection color television set includes three cathode ray tubes (CRTs), each CRT processing one of the primary colors—red, blue or green. By combining the three monochromatic beams the set can produce full color television pictures. However, in order for the set to produce accurate pictures, proper alignment of the beams must be maintained. That is, the CRTs must be calibrated so that their beams are focused at the same point on the screen. Accordingly, the calibration of the CRTs is often referred to as a convergence procedure, and beam alignment is often referred to as convergence. For a more detailed discussion of convergence, references are made to FIGS. 1 and 2.

FIG. 1 is a plan view of a model rear projection television set. The components of the set are housed within a cabinet 10, and they include: a CRT 12, a lens 14, a mirror 16, and a screen 18. The model set includes three CRTs and multiple lenses for each CRT, although for clarity, only a single CRT and a single lens are shown in the figure. The light from the CRT passes through the lens and illuminates the mirror which, in turn, reflects the light onto the screen for observation by the viewer.

FIG. 2 illustrates the relationship between the three CRTs of the model set. As can be seen from the figure, CRTs 12, 20 and 22 are matched respectively with lenses 14, 24 and 26, and the CRTs are aligned so that their beams converge. To maintain the alignment of the beams one or more photosensors are typically provided at the periphery of the screen. An example is shown in FIG. 3.

FIG. 3 includes an arrangement of four photosensors, 28, 30, 32 and 34. The sensors are located inside the cabinet and are not visible to the viewer. Also, the sensors are located behind a screen frame 36, which is not part of the display screen, and therefore the sensors do not interfere with images displayed on the screen. Nevertheless, the sensors are located within the area that can be scanned by the CRTs.

FIG. 4A shows the relationship between sensors 28–34, screen 18, and a CRT scannable area 38 as seen from the viewer's perspective. For clarity the screen frame is not shown. When performing the convergence procedure, test patterns are produced within the scannable area and detected by the sensors. More specifically, each CRT produces two test patterns, a wide pattern and a narrow pattern. Thus, to complete the convergence procedure the following patterns are produced: red-wide, red-narrow, blue-wide, blue-narrow, green-wide, and green-narrow. These patterns and their function are discussed in more detail in connection with FIGS. 4B–4E.

FIGS. 4B–4E show illustrative test patterns as generated by any one of the primary color CRTs. In the interest of brevity, FIGS. 4B–4E are discussed in the context of the red CRT only. However, it should be noted that the discussion is equally applicable to the other primary color CRTs.

FIGS. 4B and 4C show test patterns that are generated when the red CRT is properly aligned with the center of the screen. FIG. 4B shows a red-wide pattern and its relative position to the scannable area, screen, and sensors. As can be seen from the figure, the red-wide pattern is made up of four illuminated areas 40 that define a rectangle (indicated by the dotted line). Each illuminated area 40 overlaps the entirety of one sensor. The center point of the scannable area is denoted by "o" and the center of the rectangle defined by the red-wide pattern is denoted by "x". Since the red CRT is properly aligned, the o and x coincide.

FIG. 4C shows a red-narrow pattern with illuminated areas 42. As in the case of the wide pattern, since the CRT is properly aligned, the x and o coincide. However, in the case of the narrow pattern, only one half of each of the sensors is overlapped by the illuminated areas 42 of the pattern. The relative sensor overlap in the wide pattern and narrow pattern cases is key to maintaining alignment of the CRT, and will be discussed in more detail below. First, FIGS. 4D and 4E are referred to in order to show the effect of misalignment on the test patterns.

FIG. 4D shows a red-wide pattern 44 that is generated when the red CRT is misaligned by an amount $\delta$ in the horizontal direction (left of center from the viewer's perspective). Since the pattern is sufficiently wide, it still overlaps the entirety of each of the sensors. FIG. 4E shows red-narrow pattern 46 that is generated when the red CRT is misaligned by an amount $\delta$ in the horizontal direction (left of center from the viewer's perspective). In FIG. 4E, since the pattern is narrow, the sensor overlap is changed relative to the overlap shown in FIG. 4C. As will be described below, this change in overlap is used to determine the amount of misalignment, which is, in turn, used as an error signal for the purpose of correcting the misalignment.

The amount of beam misalignment at a position defined by a given sensor is determined by observing that sensor's readings when exposed to the wide and narrow patterns. The observed readings are used to form a ratio which is then compared to a desired ratio, the desired ratio being the ratio obtained for the sensor under no misalignment conditions. The difference between the measured ratio and the desired ratio indicates the amount of beam misalignment. Described below is an illustrative misalignment determination as performed by sensor 28.

FIGS. 5A–5E show the relationship between sensor 28 and various test patterns. FIG. 5A depicts the sensor in a no pattern condition. FIGS. 5B–5E show the sensor as illuminated by the patterns of FIGS. 4B–4E, respectively. To measure the misalignment, the light incident on sensor 28 is measured for each of the wide and narrow cases and a ratio of the two is computed. The value of the ratio in the no misalignment case is the desired ratio, and it is obtained in the following manner: the sensor reading under no pattern conditions (noise) is subtracted from the sensor reading under wide-pattern/no-misalignment conditions (FIG. 5B) to generate a first difference; the sensor reading under no pattern conditions is subtracted from the sensor reading under narrowpattern/no-misalignment conditions (FIG. 5C) to generate a second difference; and the second difference is divided by the first difference. To obtain the value of the ratio for the depicted misalignment: the sensor reading under no pattern conditions (noise) is subtracted from the sensor reading under wide-pattern/$\delta$-misalignment conditions (FIG. 5D) to generate a first difference; the sensor reading under no pattern conditions is subtracted from the sensor reading under narrow-pattern/δ-misalignment conditions (FIG. 5E) to generate a second difference; and the second difference is divided by the first difference. The difference between the two ratios thus obtained indicates the amount of misalignment. The red CRT is then adjusted until the ratios match. A similar procedure is executed for the other primary beams and in this way convergence is achieved.

OBJECTS AND SUMMARY OF THE INVENTION

It has been recognized that in order to achieve precise convergence the ratio calculation must be performed with a high degree of accuracy. For this purpose the calculations are typically performed digitally. However, to perform the calculations digitally the sensor readings must first be passed through an A/D converter, which introduces quantization noise into the sensor measurements and thereby degrades the convergence precision. To minimize the quantization noise introduced by the A/D converter, a high resolution A/D converter is required.

It has been further recognized that the complexity and cost of high resolution A/D converters increases with the dynamic range required of the converters. Thus, by decreasing the A/D converter dynamic range required by the convergence procedure, a less expensive A/D converter may be used without sacrificing convergence accuracy. That is, by relaxing the convergence system's dynamic range requirement, the designer may trade off some A/D dynamic range for increased A/D resolution, while keeping the price of the A/D converter constant and maintaining the accuracy of convergence calculations.

It is therefore an object of the invention to provide a convergence procedure apparatus and a convergence procedure method that can reduce the dynamic range required of A/D converters used for convergence calculations.

It is another object of the invention to provide a convergence procedure apparatus which maintains a high degree of accuracy even when CRT output levels change and/or photosensor sensitivity changes.

In an illustrative embodiment of the invention, a sensor (e.g., a photosensor) is exposed to first and second distinct convergence test patterns. The first and second test patterns have illuminated areas that cover first and second portions of the sensor, respectively, preferably first and second halves of the sensor. For each beam, first and second output signals are generated by the sensor when the first and second test patterns are generated, respectively, and alignment is determined on the basis of the output signals. The test patterns are selected in such a manner as to reduce the dynamic range requirement for the A/D converter(s) that digitize sensor output signals.

Optionally, measurement resolution is enhanced by varying test pattern density in accordance with the A/D converter input signal level so as to maintain a generally constant A/D converter input level. This approach optimizes A/D converter resolution, thereby enhancing measurement resolution even when CRT and sensor characteristics vary. Test pattern density may be reduced by generating a segregated test pattern.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 10A–10C illustrate alternative test patterns in which a constant A/D input level is maintained.

DETAILED DESCRIPTION OF CERTAIN PREFERRED EMBODIMENTS

FIGS. 6A–6D show illustrative beam convergence test patterns generated according to a preferred embodiment of the invention. Although the test patterns depicted in the figures may be generated by any one of the CRTs, they will be discussed in the context of the red CRT for clarity of presentation.

Figure 6A:
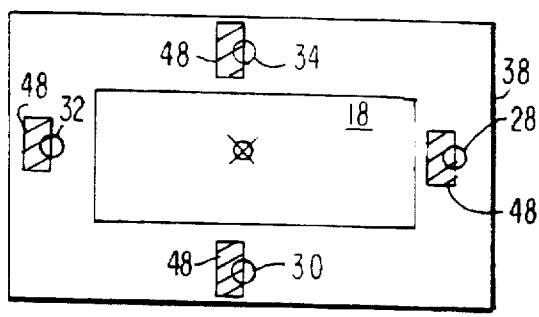
FIGS. 6A–6D show the relationship between the sensors, the display screen, the scannable area, and several test patterns in accordance with the invention.
Figure 6B:
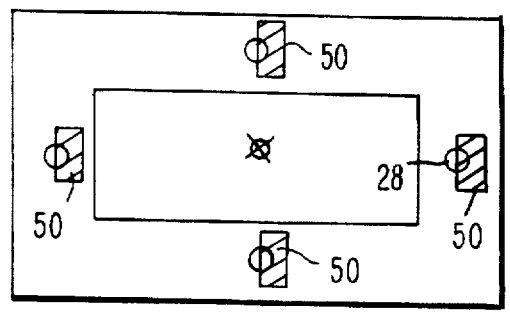

FIGS. 6A and 6B show the test patterns generated by the red CRT when it is properly aligned. FIG. 6A shows a first test pattern 48 which overlaps a left side portion (from the viewer's perspective) of each sensor. FIG. 6B shows a second test pattern 50 which overlaps a right side portion of each sensor. As was the case in FIGS. 4A–4E, "o" indicates the center of the screen and "x" indicates the center of the rectangle defined by the test patterns. The "o" and "x" coincide in FIGS. 6A and 6B since these figures represent the case of proper beam alignment.

Figure 6C:
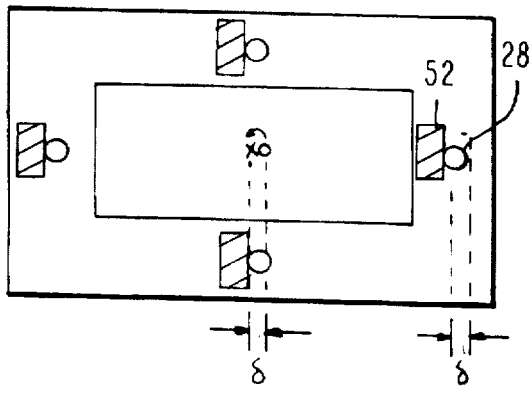
Figure 6D:
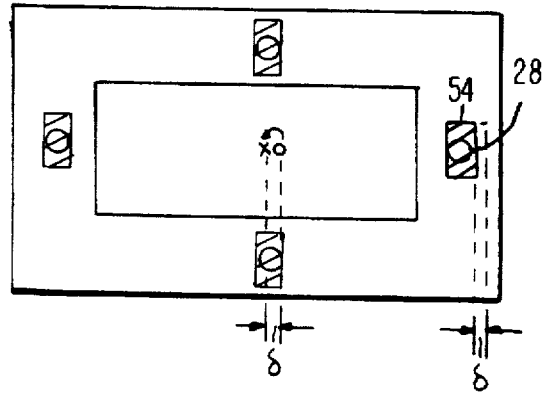

FIGS. 6C and 6D show a shifted first test pattern 52 and a shifted second test pattern 54, respectively. The shifted first pattern is the pattern that results when the CRT is misaligned and attempts to generate the first pattern. The shifted second pattern is the pattern that results when the CRT is misaligned and attempts to generate the second pattern. In both of FIGS. 6C and 6D, the CRT is misaligned by an amount δ in the horizontal direction (left of center from the viewer's perspective).

As can be seen from FIGS. 6A–6D, the effect of the misalignment on the first pattern is to shift the pattern (FIG.

6C) so that its overlap with sensor 28 significantly less than it was in the no-misalignment case (FIG. 6A). Whereas the effect of the misalignment on the second pattern is to shift the pattern (FIG. 6D) so that its overlap with sensor 28 is significantly greater than it was in the no-misalignment case (FIG. 6B). As will be described below, the overlap changes for the two test patterns that occur as a result of misalignment are used to determine the amount of misalignment. The amount of misalignment is then, in turn, used as an error signal for the purpose of correcting the misalignment.

The amount of misalignment is determined by observing the sensor readings as the sensor is exposed to the first and second patterns. The readings obtained are used to form a measured ratio that is compared to a desired ratio, the desired ratio being the ratio obtained for the sensor under no misalignment conditions. The difference between the measured ratio and the desired ratio indicates the amount of beam misalignment at the sensor's location. What follows is a description of an illustrative misalignment determination as performed on the basis of readings taken through sensor 28.

Figure 7A:
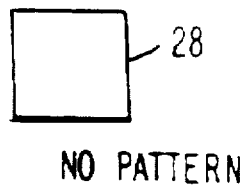
FIG. 7A is a representation of an unilluminated sensor.

FIGS. 7A–7E show the relationship between sensor 28 and various test patterns. FIG. 7A depicts the sensor in a no pattern condition. FIGS. 7B–7E show the sensor as illuminated by the patterns of FIGS. 6A–6D, respectively. To measure the misalignment, the light incident on sensor 28 is measured for each of the first pattern and second pattern measurements and used to form a ratio. The value of the ratio in the no misalignment case is the desired ratio, and it is a design parameter for the television set. To obtain the value of the desired ratio: the sensor reading under no pattern conditions (noise) is subtracted from the sensor reading under first-pattern/no-misalignment conditions (FIG. 7B) to generate a first difference; the sensor reading under no pattern conditions is subtracted from the sensor reading under second-pattern/no-misalignment conditions (FIG. 7C) to generate a second difference; the first difference is added to the second difference to form a sum; and the first difference is divided by the sum. To obtain the value of the ratio for the depicted misalignment: the sensor reading under no pattern conditions (noise) is subtracted from the sensor reading under first-pattern/δ-misalignment conditions (FIG. 7D) to generate a first difference; the sensor reading under no pattern conditions is subtracted from the sensor reading under second-pattern/δ-misalignment conditions (FIG. 7E) to generate a second difference; the first difference is added to the second difference to form a sum; and the first difference is divided by the sum. The difference between the two ratios thus obtained indicates the amount of misalignment. The red CRT is then adjusted until the ratios match. A similar procedure is executed for the other primary beams and in this manner convergence about sensor 28 is achieved. Finally, similar procedures may then be executed about the other sensors to complete an overall convergence procedure.

By using the test patterns of the present invention the dynamic range required of the sensor A/D converters is reduced. Thereby, allowing convergence procedures to be performed through more cost efficient hardware. To illustrate how the dynamic range requirement is reduced reference is made to FIGS. 5A–5E and 7A–7E.

Figure 1:
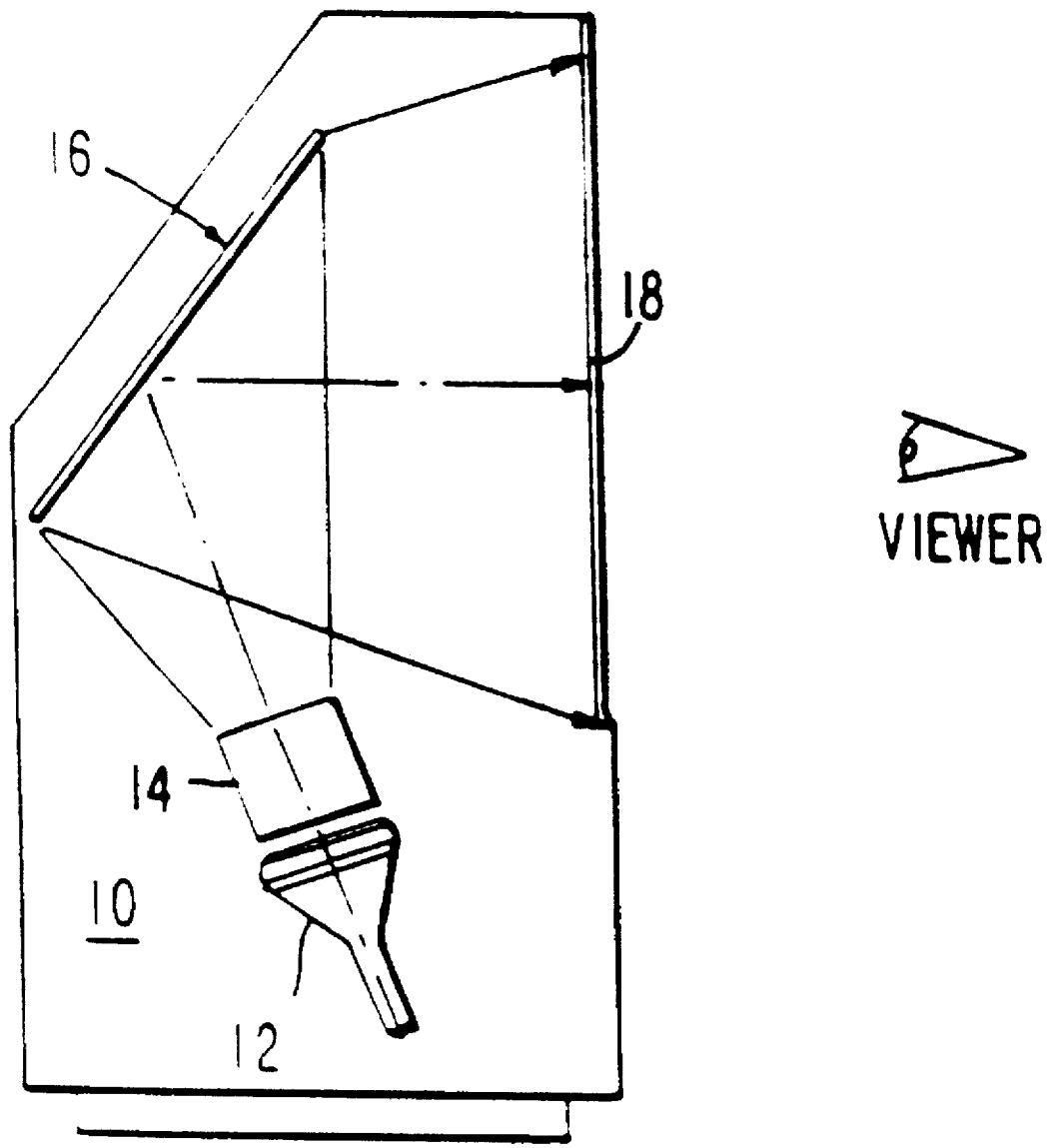
FIG. 1 is a plan view of a typical rear projection television set.
Figure 2:
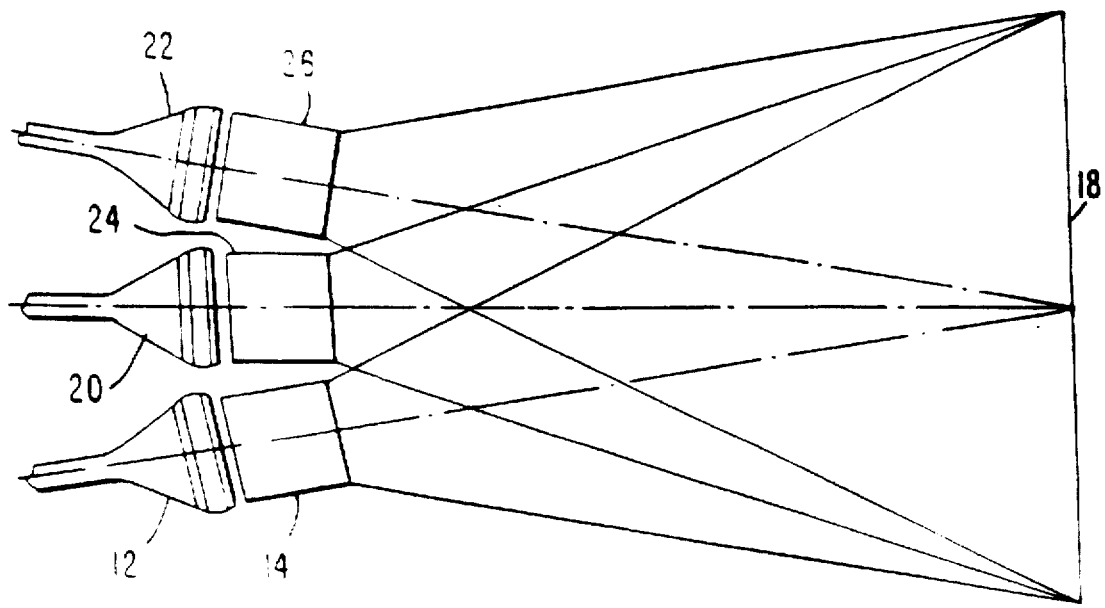
FIG. 2 illustrates the relationship between the three CRTs of the FIG. 1 set.
Figure 3:
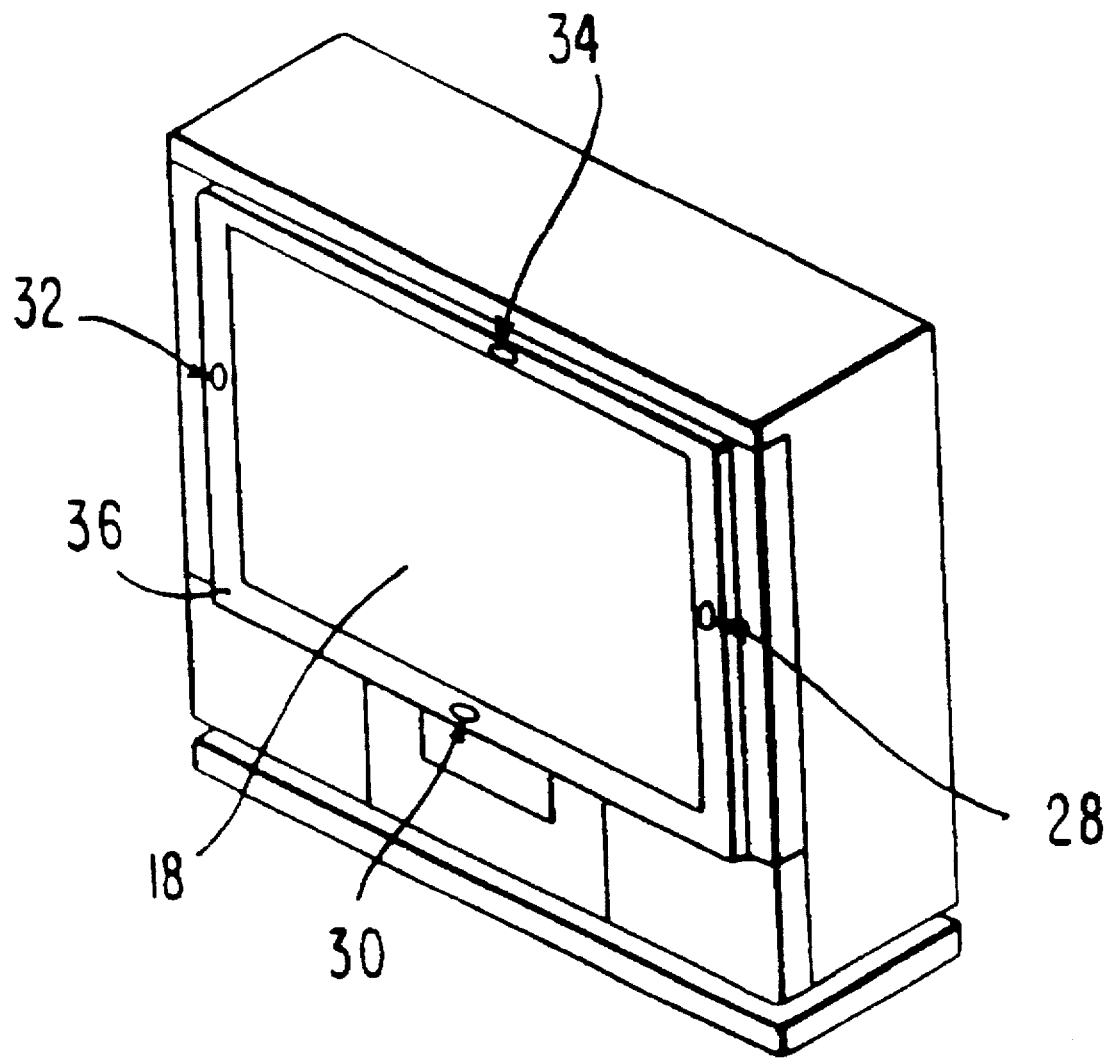
FIG. 3 shows how photosensors are typically arranged around a screen for purposes of maintaining beam convergence.
Figure 4A:
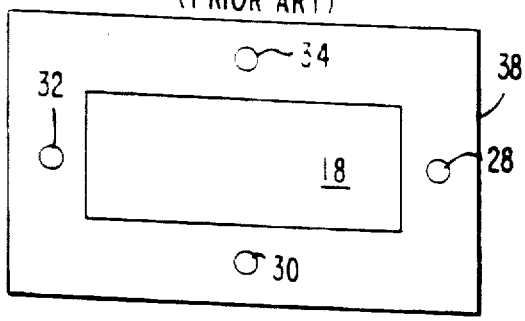
FIG. 4A shows the typical relationship between a plurality of convergence sensors, a display screen, and a CRT scannable area.
Figure 4B:
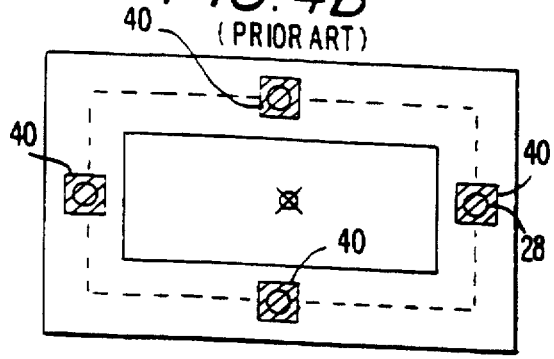
FIGS. 4B–4E show the typical relationship between the sensors, the display screen, the scannable area, and several test patterns.
Figure 4C:
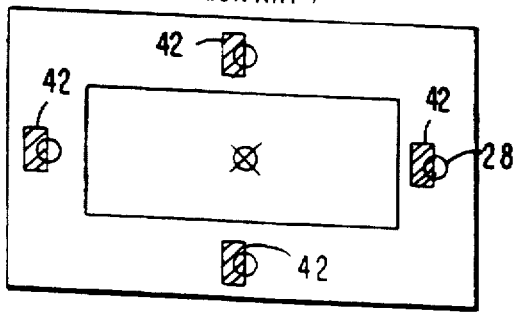
Figure 4D:
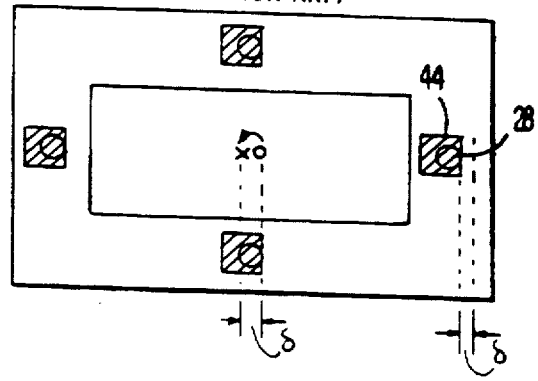
Figure 4E:
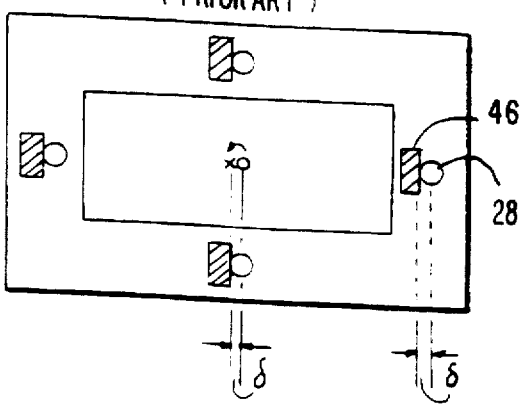
Figure 5A:
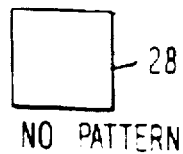
FIG. 5A is a representation of an unilluminated sensor.
Figure 5B:
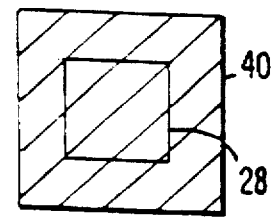
FIGS. 5B–5E are representations of the sensor of FIG. 5A as illuminated by the test patterns of FIGS. 4B–4E, respectively.
Figure 5C:
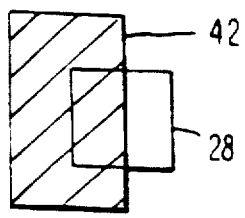
Figure 5D:
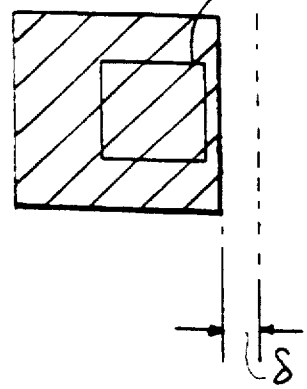
Figure 5E:
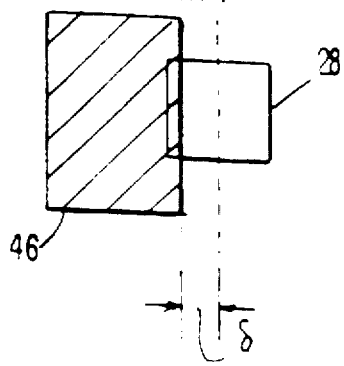

As mentioned above, A/D converters are employed to convert the output of convergence sensors from analog signals to digital signals. In prior systems, the analog sensor signals that had to be converted by the A/D converters ranged from the signal generated when the sensor was fully illuminated to the signal generated when the sensor was not illuminated at all. For example, in prior systems, the signal obtained from the unilluminated sensor in FIG. 5A and the signal from the fully illuminated sensor in FIG. 5D are both converted to digital signals so that they can be used to calculate the convergence ratio. However, in the present invention, a sensor A/D converter does not have to convert the signal from a fully illuminated sensor.

In a preferred embodiment of the present invention, the first and second test patterns are chosen such that for any given sensor the areas of the sensor overlapped by the first and second patterns are complementary. That is, the area not overlapped by the first pattern is equal to the area overlapped by the second pattern; and the area not overlapped by the second pattern is equal to the area overlapped by the first pattern. Thus, a value for a fully illuminated sensor may be obtained by adding the digitally converted output generated during illumination by the first pattern to the digitally converted output generated during illumination by the second pattern, without actually fully illuminating the sensor. Indeed, as will be explained with references to FIGS. 7B–7E, the maximum sensor illumination is close to 50%.

Figure 7B:
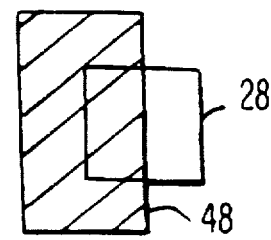
FIGS. 7B–7E are representations of the sensor of FIG. 7A as illuminated by the test patterns of FIGS. 6A–6D, respectively.
Figure 7C:
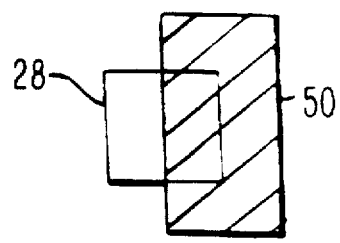
Figure 7D:
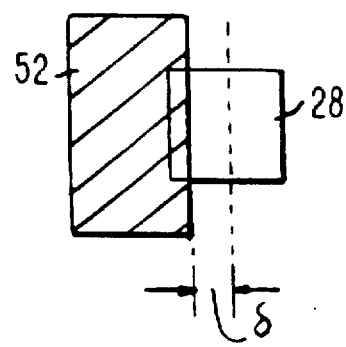
Figure 7E:
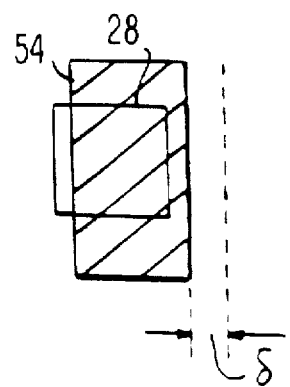

Regarding sensor illumination in the no-misalignment case, it can be seen from FIGS. 7B and 7C that the maximum signal that must be converted in the no-misalignment case is the signal corresponding to approximately 50% illumination. Regarding sensor illumination in the δ-misalignment case, it can be seen from FIG. 7E that the maximum signal that must be converted is somewhat more than the signal corresponding to approximately 50% illumination. However, the amount of misalignment δ is typically small compared to the size of the sensor, and therefore the magnitude of the signal will not be significantly larger than the signal corresponding to 50% sensor illumination. Thus, the reduction in A/D dynamic range requirement provided by the present invention is on the order of 50%.

Figure 8:
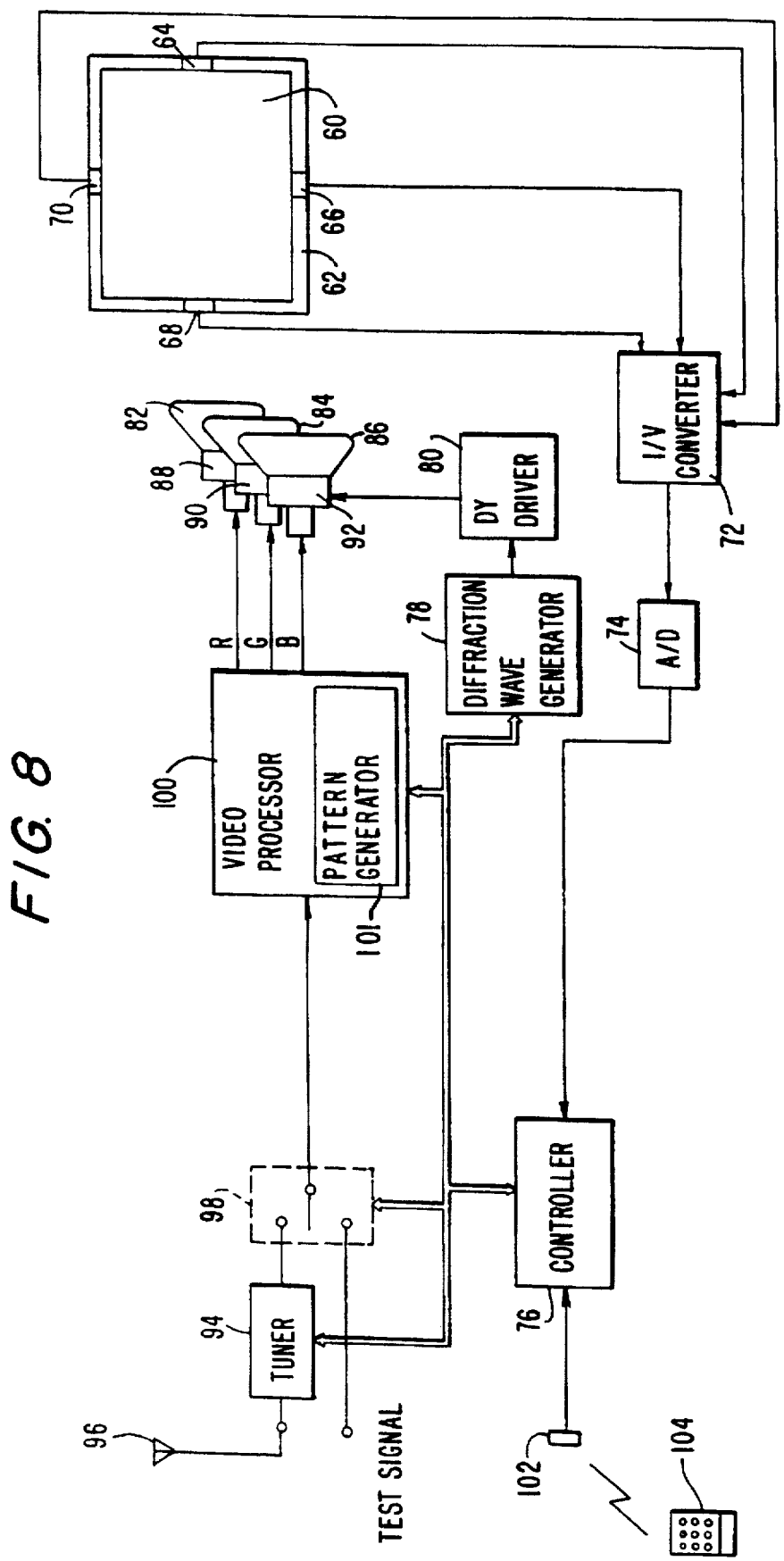
FIG. 8 is a block diagram of a television system according to the invention.

A schematic diagram of a television system according to the invention is shown in FIG. 8. The system includes a television screen 60 and three CRTs 82, 84 and 86 for forming images on the screen. Each CRT emits a beam of monochromatic light in one of the primary colors (red, blue and green), and each includes a deflection yoke, 88, 90 and 92, respectively. Control of the CRTs for the purpose of forming images on the screen is performed by a video processor 100. Accordingly, the video processor includes a pattern generator 101 for forming the convergence test patterns. Convergence adjustment of the CRTs is performed through a deflection yoke (DY) driver 80. Since the invention concerns convergence operations, the convergence portion of the system will be emphasized.

The system includes four convergence photosensors, 64, 66, 68 and 70. These sensors are located at the periphery of the screen, behind a screen frame 62. During convergence operations, the sensors generate analog current signals which are passed to a current to voltage converter 72. The current to voltage converter converts the current signals to analog voltage signals which are then routed to an A/D converter 74. Thereat, the analog signals are converted to digital voltage signals and the digital signals are supplied to a controller 76. The controller then performs the convergence calculations based on the digital signals to determine the amount of any necessary beam alignment corrections. If correction is required, the controller sends appropriate correction signals to a diffraction wave generator 78. The correction signals received by the diffraction wave generator are converted into driver signals which are, in turn, passed to deflection yoke driver 80. The driver then generates one or more deflection yoke control signals and applies them to the CRT deflection yokes. Through repeated beam adjustment by way of the deflection yokes, proper beam alignment is maintained.

In addition to the above-identified elements, the television system of FIG. 8 includes a tuner 94, an antenna 96, a switch 98, and an infrared receiver 102. The tuner is used for receiving television signals, such as broadcast signals, through the antenna. These signals are coupled to the video processor by switch 98. However, the switch may deselect the tuner in favor of a test signal for purposes of testing the system. Infrared receiver 102 is provided to allow for remote control of the system via remote control unit 104.

A/D Input Level Control

To maximize measurement resolution for the above-described automatic convergence system, the input signal level to A/D converter 74 should be maintained within a narrow range. If the A/D input level exceeds the maximum level of the A/D converter, the A/D converter output will become saturated, whereby the beam position cannot be measured. Conversely, if the A/D input level is too low, the overall measurement resolution becomes poor due to noise and to lower A/D converter resolution at low input levels. Therefore, to optimize measurement resolution, the A/D input level should be kept just under the maximum input level of the A/D converter.

Variations in CRT brightness level and in photosensor sensitivity are impediments in maintaining the A/D converter input level just below the maximum input level. These characteristics change during the course of the lives of the CRTs and photosensors. Consequently, in order to keep the A/D input level constant, a feedback loop is required.

One way of adjusting CRT brightness level and thereby control the A/D input level, is to control video processor 100 (FIG. 8) so as to change its output signal level. Thus, if a CRT's output has become less bright resulting in an A/D input level that is too low during the convergence test, video processor 100 will be controlled to provide a higher output signal to that CRT. One drawback to this approach, however, is that the video processor control necessary to implement it results in a complicated system.

In accordance with another embodiment of the present invention, A/D converter input level is maintained substantially constant by changing the measurement pattern density rather than by controlling the video processor to change its signal level output. This approach is illustrated in FIGS. 10A–10C. FIG. 10A shows the above-described patterns 48 and 50 overlaying sensor 28, where pattern 48 covers only the left half of sensor 28 and pattern 50 covers only the right half of the sensor when the CRT is perfectly aligned. Each pattern 48, 50 has an overall length L1 and width W. Sensor 28 is assumed to be a square with sides of length "d", although other shapes are also possible.

If the A/D input level resulting from the pattern generated in FIG. 10A exceeds the desired level (where the desired level is just below the maximum A/D input level), then the pattern density can be reduced to lower the A/D input level. The reduced pattern density is achieved by generating patterns such as those shown in FIG. 10B or 10C. FIG. 10B illustrates segregated-type patterns 148 and 150, where pattern 148 illuminates a portion of the left half of sensor 28 while pattern 150 illuminates a portion of the right half. Each pattern 148, 150 may have an overall length L1 and width W as in the previous case, but with segregated portions $A_1$ to $A_N$ separated by gaps g. Portions $A_1$–$A_N$ represent the illuminated areas whereas the areas of gaps g are not illuminated. The amount of signal level reduction from photosensor 28 as compared to the case of FIG. 10A is a function of the number N of illuminated areas and the size of the gaps g. Thus, the size of gaps g can be dynamically varied to maintain a constant A/D input level.

Signal level reduction can alternatively be achieved with patterns 148' and 150' of FIG. 10C, each of which has a length L2 smaller than the photosensor length d. Patterns 148' and 150' may have the same width W as in the previous cases. The length L2 of patterns 148' and 150' can be varied to maintain a constant A/D input level.

In operation, the patterns of FIG. 10B are initially generated with a predetermined gap size and predetermined number N of illuminated regions (or with a predetermined length L2 if patterns of FIG. 10C are used). Then, if the A/D input level is too high or too low, the gap size is increased or decreased, respectively (or the length L2 is varied accordingly). The system should be designed such that, for an extreme case of a CRT outputting a minimum expected signal level and photosensor 28 being at a minimum expected sensitivity level, then the patterns are allowed to approach those of FIG. 10A. With this approach, the target A/D input level will be achieved for the worst case condition.

Figure 11:
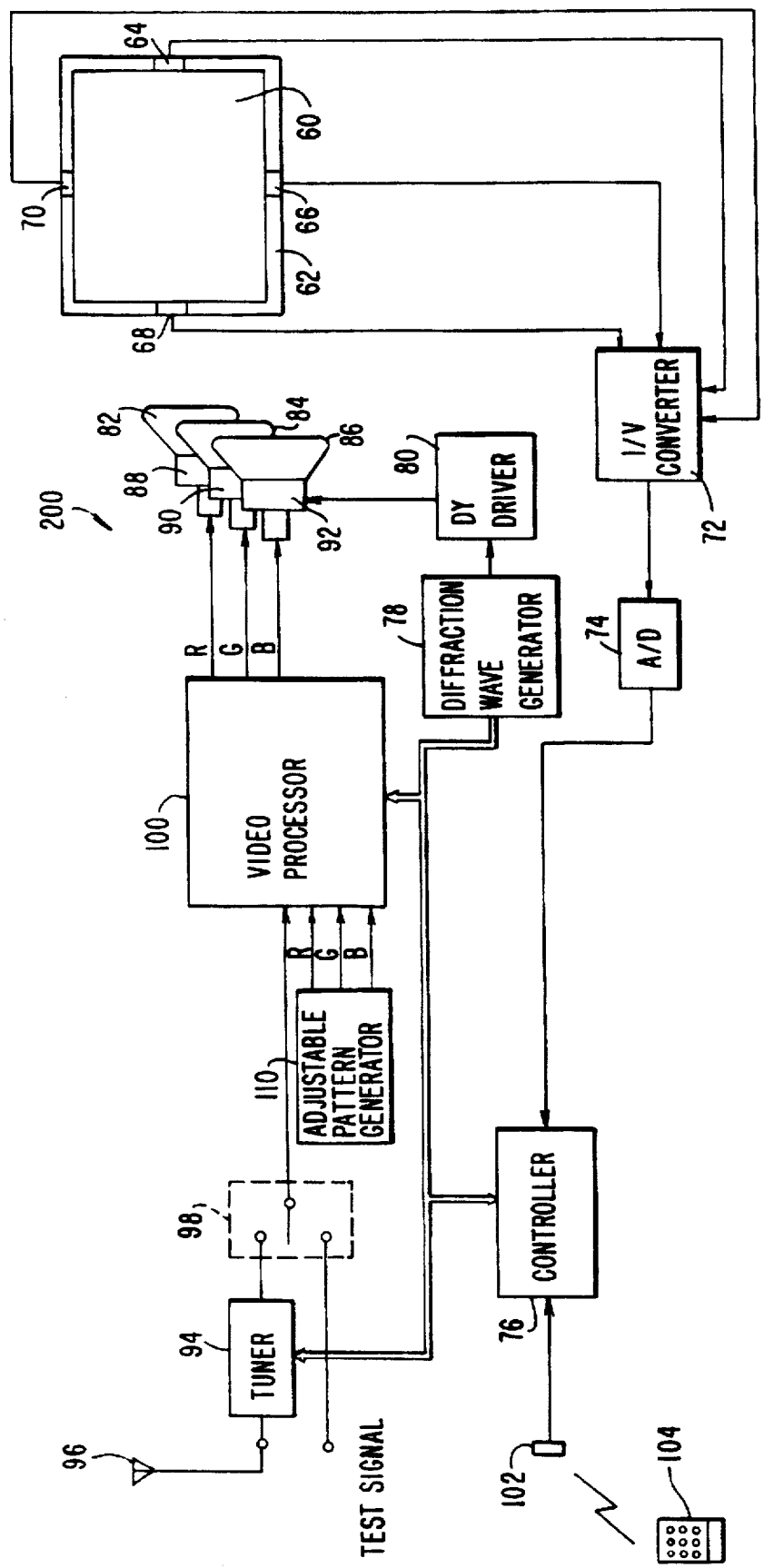
FIG. 11 is a schematic diagram of another television system according to the invention.

FIG. 11 is a block diagram of a television system 200 configured to generate the adjustable convergence test patterns of FIGS. 10B and/or 10C. Television system 200 differs from the system of FIG. 8 by utilizing an adjustable pattern generator 110 to generate test patterns for illumination by the respective red, green and blue CRTs 82, 84 and 86. Different test patterns may be generated for illumination by each CRT due to the differences in the brightness characteristics of the CRTs and/or differences in the sensitivity of the photosensor for the different colors. Other aspects of television system 200 are essentially the same as those for the system of FIG. 8. The test patterns are provided to video processor 100, which outputs voltages at appropriate times to the CRTs during the beam scanning procedure to illuminate each photosensor in accordance with the test pattern. In this embodiment, controller 76 is configured to provide pattern-adjust control signals to pattern generator 110 based on the digital output signals of A/D converter 74. If the digital outputs for a particular CRT indicate that the A/D input level is too low or too high, controller 76 outputs a command signal indicative of that condition to pattern generator 110, which then adjusts the pattern density accordingly. Pattern generator 110, while shown separate from video processor 100 and controller 76, may be embodied as software or firmware running either within video processor 100 or controller 76.

While the present invention has been particularly shown and described in conjunction with preferred embodiments thereof, it will be readily appreciated by those of ordinary skill in the art that various changes may be made without departing from the spirit and scope of the invention. For example, for one or more sensors used in a convergence procedure, the area overlapped by the first test pattern when added to the area overlapped by the second test pattern does not need to equal the entire area of the sensor(s), but rather may be equal to some other predetermined area.

Figure 9:
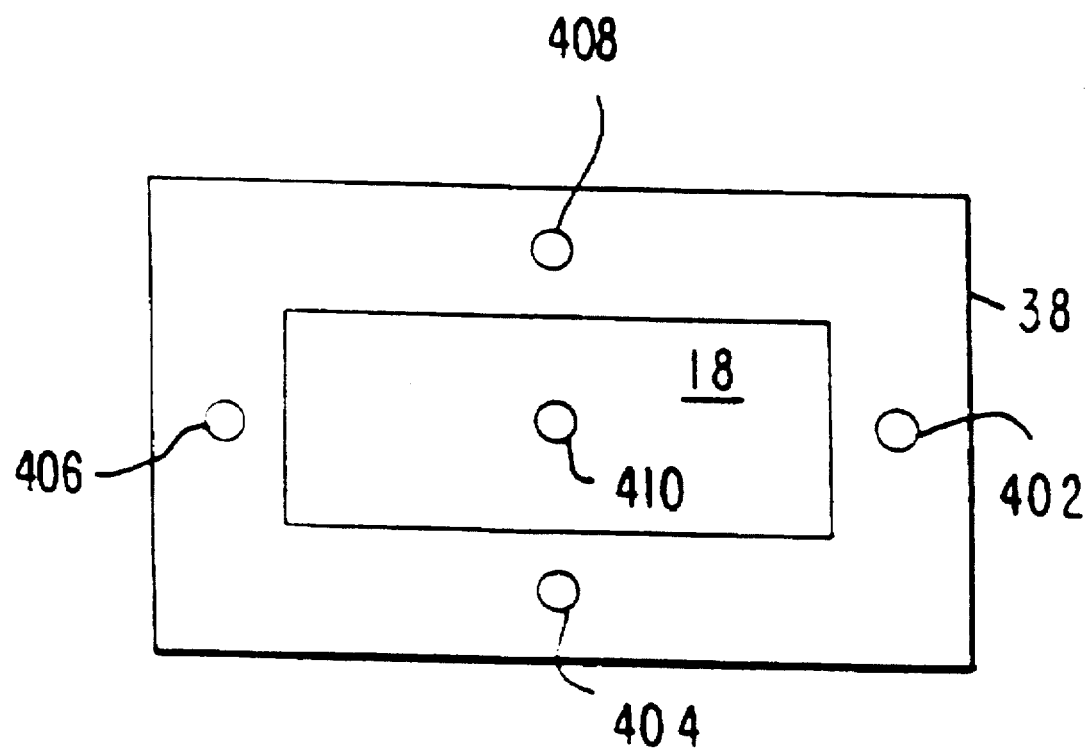
FIG. 9 shows the relationship between sensors, display screen, and scannable area for an alternative sensor arrangement in accordance with the invention.

Moreover, sensor arrangements other than those described above may be employed. For example, sensors may be arranged as shown in FIG. 9. In the FIG. 9 configuration, five sensors are employed, 402–410, sensor 410 being located at the center of the screen. Convergence testing is conducted in the same manner as described above with the exception that the test patterns include five illuminated areas.

Furthermore, the invention is applicable to many types of video displays and is not limited to rear projection television sets. For example, the invention may be employed in computer system monitors. Also, it is contemplated that the automatic convergence method of the present invention may be applied to an electron beam-based system, in which case electron beam sensors would be used in place of the photosensors.

In addition, the method described above in connection with FIGS. 10–11, in which adjustable test patterns are generated of varying pattern density to maintain a generally constant A/D input level, may be applied to other types of test convergence systems. For instance, the varying density pattern technique may also be applied (with suitable algorithms) to control A/D input levels for the type of system in which a first test pattern covers an entire sensor while a second test pattern covers only a portion of one sensor, e.g., such as a system corresponding to FIGS. 4A–4E.

Therefore, it is intended that the appended claims be interpreted as including the embodiments described herein, the alternatives mentioned above, and all equivalents thereto.

What is claimed is:

1. An apparatus for performing convergence calibration in a system that uses multiple beams to generate a video display on a screen, comprising:

a sensor;

a circuit arrangement operative to generate a first test pattern having a first illuminated area that covers a first portion of said sensor, and a second test pattern having a second illuminated area that covers a second portion of said sensor different from said first portion; wherein for each beam, first and second output signals are generated by said sensor when said first and second test patterns are generated, respectively; and an analog to digital (A/D) converter for digitizing said first and second sensor output signals;

wherein said circuit arrangement is operable to detect an input signal level to said A/D converter, and to modify said first and second test patterns in accordance therewith so as to maintain said A/D input signal level within a predetermined range; and wherein said circuit arrangement is operable to determine beam alignment on the basis of said first and second output signals.

2. The apparatus of claim 1 wherein said first illuminated area covers approximately a first half of said sensor and said second illuminated area covers approximately a second half of said sensor.

3. The apparatus of claim 1 wherein when no test pattern is generated, a no pattern output signal is generated by said sensor, and said beam alignment is determined on the basis of said first and second output signals and said no pattern output signal.

4. The apparatus of claim 1 wherein said first and second modified test patterns are each segregated patterns having illuminated regions separated by non-illuminated regions, said non-illuminated regions serving to reduce sensor output signal level, with dimensions thereof being varied so as to maintain said A/D converter input level within said predetermined range.

5. The apparatus of claim 1 wherein said first and second modified test patterns each cover less than one half of said sensor, with the size of the illuminated area of each test pattern being varied so as to maintain said A/D converter input level within said predetermined range.

6. The apparatus of claim 1 wherein first and second test patterns of red, blue and green are each generated by means of respective red, blue and green cathode ray tubes (CRTs), and said apparatus further includes:

a controller coupled to an output of said A/D converter and operative to determine said A/D converter input level and to provide a control signal in accordance therewith; and an adjustable pattern generator operative to generate, responsive to said control signal, different test patterns for respective red, blue and green CRTs so as to maintain said A/D converter input level within said predetermined range for each of said red, blue and green test patterns.

7. The apparatus of claim 1 further including at least one additional sensor whereby a plurality of sensors are provided, each at a different location with respect to said screen and each operable in conjunction with said circuit arrangement to output sensor signals for convergence calibration.

8. A method for performing convergence calibration in a system that uses multiple beams to generate a video display on a screen, comprising:

illuminating a first portion of a sensor with a first test pattern without illuminating a first remaining portion of the sensor;

illuminating a second portion of said sensor with a second test portion without illuminating a second remaining portion of said sensor;

producing, by said sensor, first and second output signals due to said illumination;

digitizing each of said first and second output signals with at least one analog to digital (A/D) converter;

maintaining the input signal level to said A/D converter within a predetermined range by adjusting said first and second test patterns; and performing beam alignment based on a comparison of said first and second output signals.

9. The method of claim 8 wherein said first and second portions of said sensor are each approximately one half of the sensor.

10. The method of claim 8 wherein said first and second test patterns are each segregated test patterns, and are each adjusted by adjusting gaps between illuminated regions thereof.

11. The method of claim 8 wherein said first and second test patterns each illuminate less than one half of said sensor, and said test patterns are each adjusted by adjusting the dimensions of an illuminated area thereof.

12. The method of claim 8, further comprising generating said first and second test patterns for separate illuminations of red, blue and green, and adjusting pattern density of each of said first and second test patterns for each of said red, blue and green illuminations so as to maintain said A/D converter input level within said predetermined range for each of said illuminations.

* * * * *